(12) United States Patent
Zheng et al.

(10) Patent No.: US 10,824,874 B2
(45) Date of Patent: Nov. 3, 2020

(54) METHOD AND APPARATUS FOR PROCESSING VIDEO

(71) Applicant: BEIJING BAIDU NETCOM SCIENCE AND TECHNOLOGY CO., LTD., Beijing (CN)

(72) Inventors: Yehan Zheng, Beijing (CN); Yu Luo, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/352,526

(22) Filed: Mar. 13, 2019

(65) Prior Publication Data

US 2019/0377956 A1 Dec. 12, 2019

(30) Foreign Application Priority Data

Jun. 8, 2018 (CN) .......................... 2018 1 0585416

(51) Int. Cl.
*G06F 16/78* (2019.01)
*G06K 9/00* (2006.01)
*G06F 16/783* (2019.01)

(52) U.S. Cl.
CPC ..... *G06K 9/00751* (2013.01); *G06F 16/7837* (2019.01); *G06F 16/7844* (2019.01); *G06F 16/7867* (2019.01); *G06K 9/00765* (2013.01)

(58) Field of Classification Search
None
See application file for complete search history.

(56) References Cited

U.S. PATENT DOCUMENTS

2011/0018889 A1* 1/2011 Dalal ................ H04N 5/91
345/581
2016/0188715 A1 6/2016 Chen
(Continued)

FOREIGN PATENT DOCUMENTS

| JP | WO 2007043679 A | 4/2009 |
| JP | 2009260762 A | 11/2009 |
| JP | 2011130064 A | 6/2011 |

OTHER PUBLICATIONS

Hu, "A Survey on Visual Content-Based Video Indexing and Retrieval," IEEE Transactions on Systems, Man, and Cybernetics-Part C: Applications and Reviews, vol. 41, No. 6, Nov. 2011, XP011479468.

(Continued)

*Primary Examiner* — Eileen M Adams
(74) *Attorney, Agent, or Firm* — Knobbe, Martens, Olson & Bear, LLP

(57) ABSTRACT

Embodiments of the present disclosure disclose a method and apparatus for processing a video. A specific embodiment of the method comprises: acquiring a target video and target video element information of the target video; extracting, based on the target video element information, a target video clip from the target video; obtaining, based on a preset corresponding relationship between video element information and a keyword determining method for a video clip, a keyword representing a category of the target video clip; and matching the keyword and with preset tag information set to obtain tag information of the target video clip, and associating and storing the target video clip and the tag information.

18 Claims, 10 Drawing Sheets

(56) References Cited

U.S. PATENT DOCUMENTS

2017/0238055 A1* 8/2017 Chang .............. H04N 21/44008
725/19
2020/0094964 A1* 3/2020 Myslinski .......... G06Q 30/0201

OTHER PUBLICATIONS

Huiping, et al., "Video Indexing and Retrieval Based on Recognized Text," Language and Media Processing Lab, Center for Automation Research, University of Maryland, College Park, 2002, 4 pages, XP010642556.

* cited by examiner

METHOD AND APPARATUS FOR PROCESSING VIDEO

CROSS-REFERENCE TO RELATED APPLICATIONS

This application claims priority to Chinese Patent Application No. 201810585416.2, filed on Jun. 8, 2018, titled "Method and apparatus for processing video," which is hereby incorporated by reference in its entirety.

TECHNICAL FIELD

Embodiments of the present disclosure relate to the field of computer technology, and specifically to a method and apparatus for processing a video.

BACKGROUND

In the existing technology, in order to implement the classification of video content, adding tag needs to be processed on a video (e.g., the tag may be a brief introduction to the video content, a keyword of the video content and a search rank of the video in a certain time period), to provide more details on the classification of the video contents. Taking the video recommending technology as an example, the tag of the video may be combined with the information regarding the users' attention, to achieve the purpose of recommending the video to the users more accurately.

SUMMARY

Embodiments of the present disclosure provide a method and apparatus for processing a video, and a method and apparatus for generating recommendation information.

In a first aspect, embodiments of the present disclosure provide a method for processing a video. The method includes: acquiring a target video and target video element information of the target video; extracting, based on the target video element information, a target video clip from the target video; obtaining, based on a preset corresponding relationship between video element information and a keyword determining method for a video clip, a keyword representing a category of the target video clip; and matching the keyword with a preset tag information set to obtain tag information of the target video clip, and associating and storing the target video clip and the tag information.

In some embodiments, the target video element information is an image frame included in the target video. The extracting, based on the target video element information, a target video clip from the target video includes: performing, for the image frame included in the target video, image recognition on the image frame to obtain an image recognition result for the image frame; and determining a video clip including image frames having associated image recognition results and arranged consecutively in the target video as the target video clip.

In some embodiments, the obtaining, based on a preset corresponding relationship between video element information and a keyword determining method for a video clip, a keyword representing a category of the target video clip includes: determining, based on a preset corresponding relationship between the image recognition result and the keyword, the keyword corresponding to the image recognition result for the image frame included in the target video clip as the keyword of the target video clip.

In some embodiments, the target video element information is a set of text information corresponding to the image frame included in the target video. The extracting, based on the target video element information, a target video clip from the target video includes: extracting, for the image frame included in the target video, a target vocabulary included in the text information corresponding to the image frame; and determining a video clip including image frames corresponding to associated target vocabularies as the target video clip.

In some embodiments, the obtaining, based on a preset corresponding relationship between video element information and a keyword determining method for a video clip, a keyword representing a category of the target video clip includes: selecting, from target vocabularies corresponding to image frames included in the target video clip, a target vocabulary as the keyword of the target video clip.

In some embodiments, the target video element information includes a set of text information corresponding to an image frame included in the target video, and text introduction information for the target video. The extracting, based on the target video element information, a target video clip from the target video includes: determining, for the image frame included in the target video, a similarity between the text information corresponding to the image frame and the text introduction information; and determining a video clip including image frames associated with an image frame corresponding to a similarity greater than a preset similarity threshold as the target video clip.

In some embodiments, the obtaining, based on a preset corresponding relationship between video element information and a keyword determining method for a video clip, a keyword representing a category of the target video clip includes: extracting, for the image frames included in the target video clip, target vocabularies included in text information corresponding to the image frames; and selecting, from the target vocabularies corresponding to the image frames included in the target video clip, a target vocabulary as the keyword of the target video clip.

In some embodiments, the target video element information is a set of bullet screen information corresponding to an image frame included in the target video. The extracting, based on the target video element information, a target video clip from the target video includes: determining, for the image frame included in the target video, a number of pieces of the bullet screen information corresponding to the image frame; and determining a video clip including image frames corresponding to bullet screen information and arranged consecutively in the target video as the target video clip, numbers of pieces of the bullet screen information corresponding to the image frames being greater than a preset number threshold.

In some embodiments, the obtaining, based on a preset corresponding relationship between video element information and a keyword determining method for a video clip, a keyword representing a category of the target video clip includes: recognizing, for image frames included in the target video clip, bullet screen information corresponding to the image frames, to obtain bullet screen category information representing a category of the bullet screen information corresponding to the image frames as a keyword of the target video clip.

In some embodiments, the target video element information is dubbing information of the target video. The extracting, based on the target video element information, a target video clip from the target video includes: performing audio recognition on the dubbing information, to obtain at least one piece of dubbing category information and a dubbing clip corresponding to the dubbing category information and included in the dubbing information, the dubbing category information representing a category of the corresponding dubbing clip; and selecting target dubbing category information from the at least one piece of dubbing category information, and determining a video clip corresponding to a dubbing clip corresponding to the target dubbing category information as the target video clip.

In some embodiments, the obtaining, based on a preset corresponding relationship between video element information and a keyword determining method for a video clip, a keyword representing a category of the target video clip includes: recognizing, based on a preset corresponding relationship between the dubbing category information and an audio recognition method, the dubbing clip corresponding to the target video clip, to obtain a keyword representing a category of the dubbing clip corresponding to the target video clip as the keyword of the target video clip.

In a second aspect, embodiments of the present disclosure provide a method for generating recommendation information. The method includes: acquiring attention information representing content paid attention to by a target user, and matching the attention information with preset tag information, the tag information being obtained according to the method described in any implementation in the first aspect, and having a corresponding video clip; and generating, in response to determining the matching being successful, recommendation information for recommending the video clip.

In a third aspect, embodiments of the present disclosure provide an apparatus for processing a video. The apparatus includes: an acquiring unit, configured to acquire a target video and target video element information of the target video; an extracting unit, configured to extract, based on the target video element information, a target video clip from the target video; a determining unit, configured to obtain, based on a preset corresponding relationship between video element information and a keyword determining method for a video clip, a keyword representing a category of the target video clip; and a storing unit, configured to match the keyword with a preset tag information set to obtain tag information of the target video clip, and associate and store the target video clip and the tag information.

In some embodiments, the target video element information is an image frame included in the target video. The extracting unit includes: a first recognizing module, configured to perform, for the image frame included in the target video, image recognition on the image frame to obtain an image recognition result for the image frame; and a first determining module, configured to determine a video clip including image frames having associated image recognition results and arranged consecutively in the target video as the target video clip.

In some embodiments, the determining unit is further configured to determine, based on a preset corresponding relationship between the image recognition result and the keyword, the keyword corresponding to then image recognition result for an image frame included in the target video clip as the keyword of the target video clip.

In some embodiments, the target video element information is a set of text information corresponding to the image frame included in the target video. The extracting unit includes: a first extracting module, configured to extract, for the image frame included in the target video, a target vocabulary included in the text information corresponding to the image frame; and a second determining module, configured to determine a video clip including image frames corresponding to associated target vocabularies as the target video clip.

In some embodiments, the determining unit is further configured to select, from target vocabularies corresponding to image frames included in the target video clip, a target vocabulary as the keyword of the target video clip.

In some embodiments, the target video element information includes a set of text information corresponding to an image frame included in the target video, and text introduction information for the target video. The extracting unit includes: a third determining module, configured to determine, for the image frame included in the target video, a similarity between the text information corresponding to the image frame and the text introduction information; and a fourth determining module, configured to determine a video clip including image frames associated with an image frame corresponding to a similarity greater than a preset similarity threshold as the target video clip.

In some embodiments, the determining unit includes: a second extracting module, configured to extract, for image frames included in the target video clip, target vocabularies included in text information corresponding to the image frames; and a first selecting module, configured to select, from the target vocabularies corresponding to the image frames included in the target video clip, a target vocabulary as the keyword of the target video clip.

In some embodiments, the target video element information is a set of bullet screen information corresponding to an image frame included in the target video. The extracting unit includes: a fifth determining module, configured to determine, for the image frame included in the target video, a number of pieces of the bullet screen information corresponding to the image frame; and a sixth determining module, configured to determine a video clip including image frames corresponding to bullet screen information and arranged consecutively in the target video as the target video clip, numbers of pieces of the bullet screen information corresponding to the image frames being greater than a preset number threshold.

In some embodiments, the determining unit is further configured to recognize, for image frames included in the target video clip, the bullet screen information corresponding to the image frames, to obtain bullet screen category information representing a category of the bullet screen information corresponding to the image frames as the keyword of the target video clip.

In some embodiments, the target video element information is dubbing information of the target video. The extracting unit includes: a second recognizing module, configured to perform audio recognition on the dubbing information, to obtain at least one piece of dubbing category information and a dubbing clip corresponding to the dubbing category information and included in the dubbing information, the dubbing category information representing a category of the corresponding dubbing clip; and a second selecting module, configured to select target dubbing category information from the at least one piece of dubbing category information, and determine a video clip corresponding to a dubbing clip corresponding to the target dubbing category information as the target video clip.

In some embodiments, the determining unit is further configured to recognize, based on a preset corresponding relationship between the dubbing category information and an audio recognition method, the dubbing clip corresponding to the target video clip, to obtain a keyword representing a category of the dubbing clip corresponding to the target video clip as the keyword of the target video clip.

In a fourth aspect, embodiments of the present disclosure provide an apparatus for generating recommendation information. The apparatus includes: an acquiring unit, configured to acquire attention information representing content paid attention to by a target user, and match the attention information with preset tag information, the tag information being obtained according to the method described in any implementation in the first aspect, and having a corresponding video clip; and a generating unit, configured to generate, in response to determining the matching being successful, recommendation information for recommending the video clip.

In a fifth aspect, embodiments of the present disclosure provide a server. The server includes: one or more processors; and a storage apparatus, configured to store one or more programs. The one or more programs, when executed by the one or more processors, cause the one or more processors to implement the method described in any implementation in the first aspect or in the second aspect.

In a sixth aspect, embodiments of the present disclosure provide a computer readable medium storing a computer program. The computer program, when executed by a processor, causes the processor to implement the method described in any implementation in the first aspect or in the second aspect.

According to the method and apparatus for processing a video provided by the embodiments of the present disclosure, the target video clip is extracted from the target video by using the target video element information of the target video. Then, the keyword of the target video clip is obtained based on a preset keyword determining method. Finally, the keyword is matched with the preset tag information set to obtain the tag information of the target video clip, and the target video clip and the tag information are associated and stored. Thus, improving the accuracy of adding the tag information to the video clip, and enriching the means of adding the tag information to the video clip.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
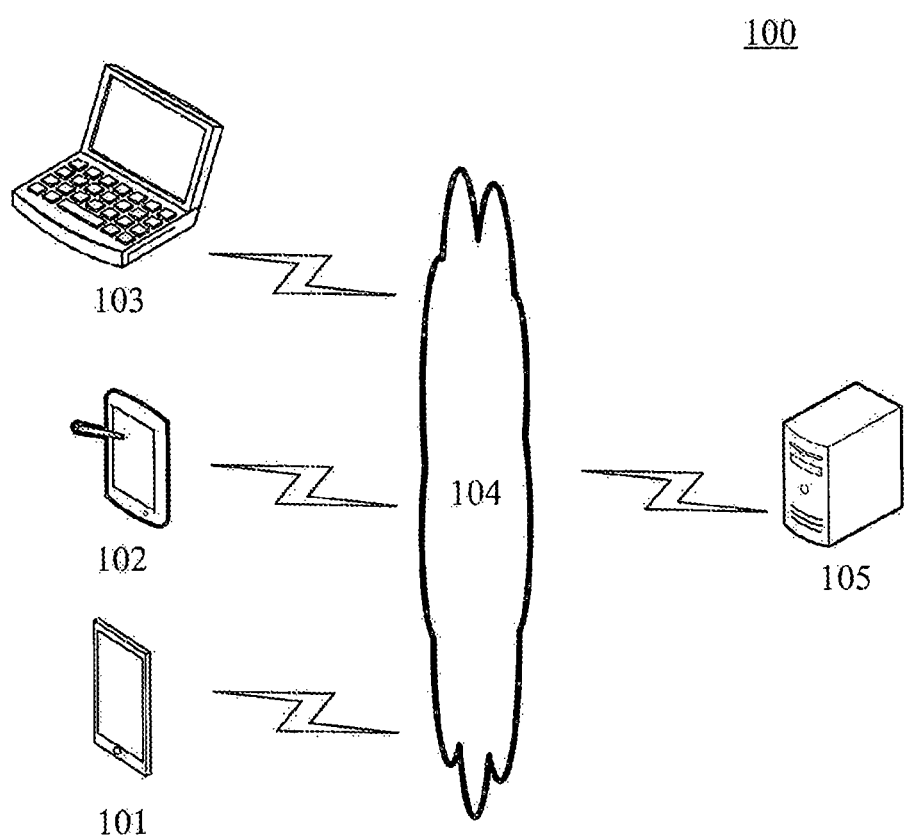
FIG. 1 is a diagram of an exemplary system architecture in which an embodiment of the present disclosure may be applied.

FIG. 1 shows an exemplary system architecture 100 in which a method for processing a video or an apparatus for processing a video according to an embodiment of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send messages. Various communication client applications, such as video playing applications and web browser applications, may be installed on the terminal devices 101, 102 and 103.

The terminal devices 101, 102 and 103 may be hardware or software. When the terminal devices 101, 102 and 103 are hardware, the terminal devices 101, 102 and 103 may be various electronic devices having a display screen and supporting playing of video, which include, but not limited to, a smart phone, a tablet computer, a laptop portable computer and a desktop computer. When the terminal devices 101, 102 and 103 are software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend video resource server providing a support for a video played on the terminal devices 101, 102 and 103. The backend video resource server may process an acquired video (e.g., a video acquired from the terminal devices or other servers), and store the processing result (e.g., a video clip and tag information of the video clip) or push the video clip to the terminal devices.

It should be noted that the method for processing a video or a method for generating recommendation information provided by the embodiments of the present disclosure is generally performed by the server 105. Correspondingly, the apparatus for processing a video or an apparatus for generating recommendation information is generally provided in the server 105.

It should be noted that the server may be hardware or software. When the server is the hardware, the server may be implemented as a distributed server cluster composed of a plurality of servers, or as a single server. When the server is the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

Figure 2:
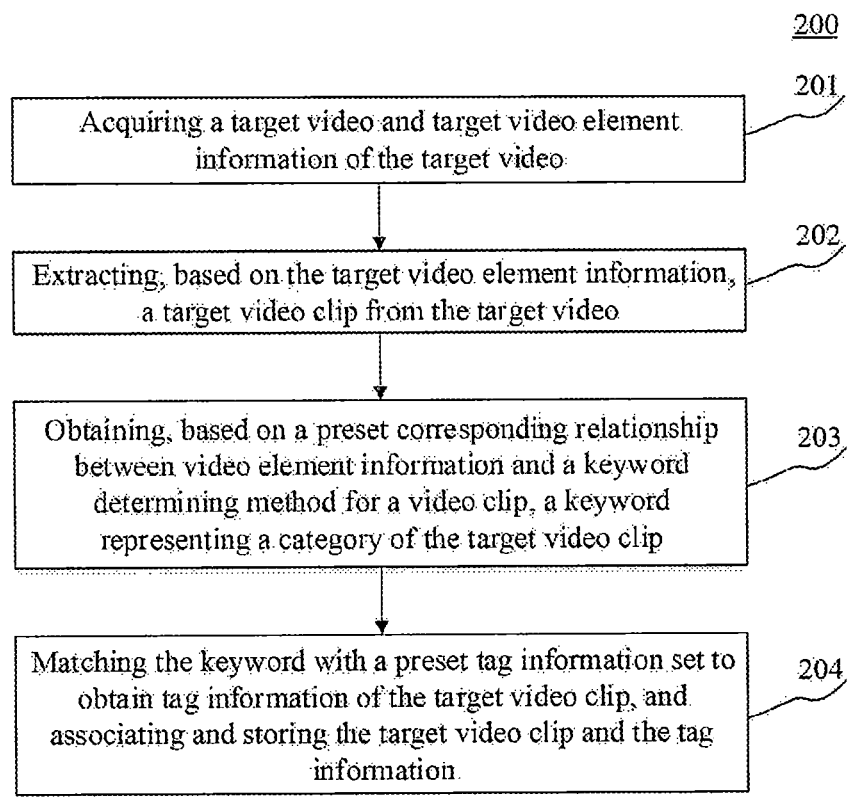
FIG. 2 is a flowchart of an embodiment of a method for processing a video according to the present disclosure.

Further referring to FIG. 2, a flow 200 of an embodiment of a method for processing a video according to the present disclosure is illustrated. The method for processing a video includes the following steps.

Step 201, acquiring a target video and target video element information of the target video.

In this embodiment, an executing body (e.g., the server shown in FIG. 1) of the method for processing the video may remotely or locally acquire the target video and the target video element information of the target video by means of a wired connection or a wireless connection. The target video may be a video in a certain preset video set (e.g., a video provided by a certain video website). The video element information may be various kinds of information (e.g., subtitle, dubbing, image frame, name and playing time) corresponding to the target video, and the target video element information may include at least one kind of information in the various kinds of information.

Step 202, extracting, based on the target video element information, a target video clip from the target video.

In this embodiment, based on the target video element information acquired in step 201, the executing body may extract the target video clip from the target video. Specifically, the executing body may extract the target video clip from the target video in various ways. For example, when the target video element information is an image frame included in the target video, the executing body may recognize each image frame to obtain a category of an object image included in the each image frame, and determine a video clip corresponding to image frames belonging to the same category (e.g., image frames including a weapon image) as the target video clip.

Step 203, obtaining, based on a preset corresponding relationship between video element information and a keyword determining method for a video clip, a keyword representing a category of the target video clip.

In this embodiment, the executing body may obtain the keyword representing the category of the target video clip based on the preset corresponding relationship between the video element information and the keyword determining method for the video clip. The corresponding relationship between the video element information and the keyword determining method may be represented by a preset program list, and a program in the program list may correspond to at least one piece of video element information. As an example, assuming that the target video element information is an image frame included in the target video, the executing body may execute a corresponding program automatically or according to an operation of a technician. Using the recognition result for the each image frame obtained in step 202, the program determines the recognition result for the image frame included in the target video clip as the keyword of the target video clip. Alternatively, the program may re-recognize the image frames included in the target video clip, to further recognize more information (e.g., the number of objects and a movement of a person included in the each image frame) as the keyword of the target video clip.

Step 204, matching the keyword with a preset tag information set to obtain tag information of the target video clip, and associating and storing the target video clip and the tag information.

In this embodiment, based on the keyword obtained in step 203, the executing body may match the keyword with the preset tag information set to obtain the tag information of the target video clip, and associate and store the target video clip and the tag information. The tag information set may include at least one subset, and each subset may be a set of a series of related tag information. For example, a certain subset includes the following tag information: "war," "battle," "weapon," etc. When the keyword of the target video clip is contained in the tag information included in the subset, at least one piece of tag information (e.g., "war") in the subset may be determined as the tag information of the target video clip.

In practice, the tag information set may be a preset knowledge base. The knowledge base stores a plurality of pieces of knowledge information, and each piece of knowledge information corresponds to a series of key information. For example, for the knowledge information marked as "war," the knowledge information may include the following key information: "a number of people being greater than or equal to 2," "using a weapon," "bleeding," etc. When the keyword of the target video clip satisfies at least one piece of information in the above key information, the tag information of the target video clip may be set to "war." As another example, when a certain piece of knowledge information is marked as the name of a song, the knowledge information may include the key information such as the singer of the song, the author of the song, and the style of the song (e.g., "graceful and restrained" and "bold and unconstrained"). When the keyword of the target video clip is the name of the song, at least one piece of key information corresponding to the song name may be used as the tag information of the target video clip.

Figure 3:
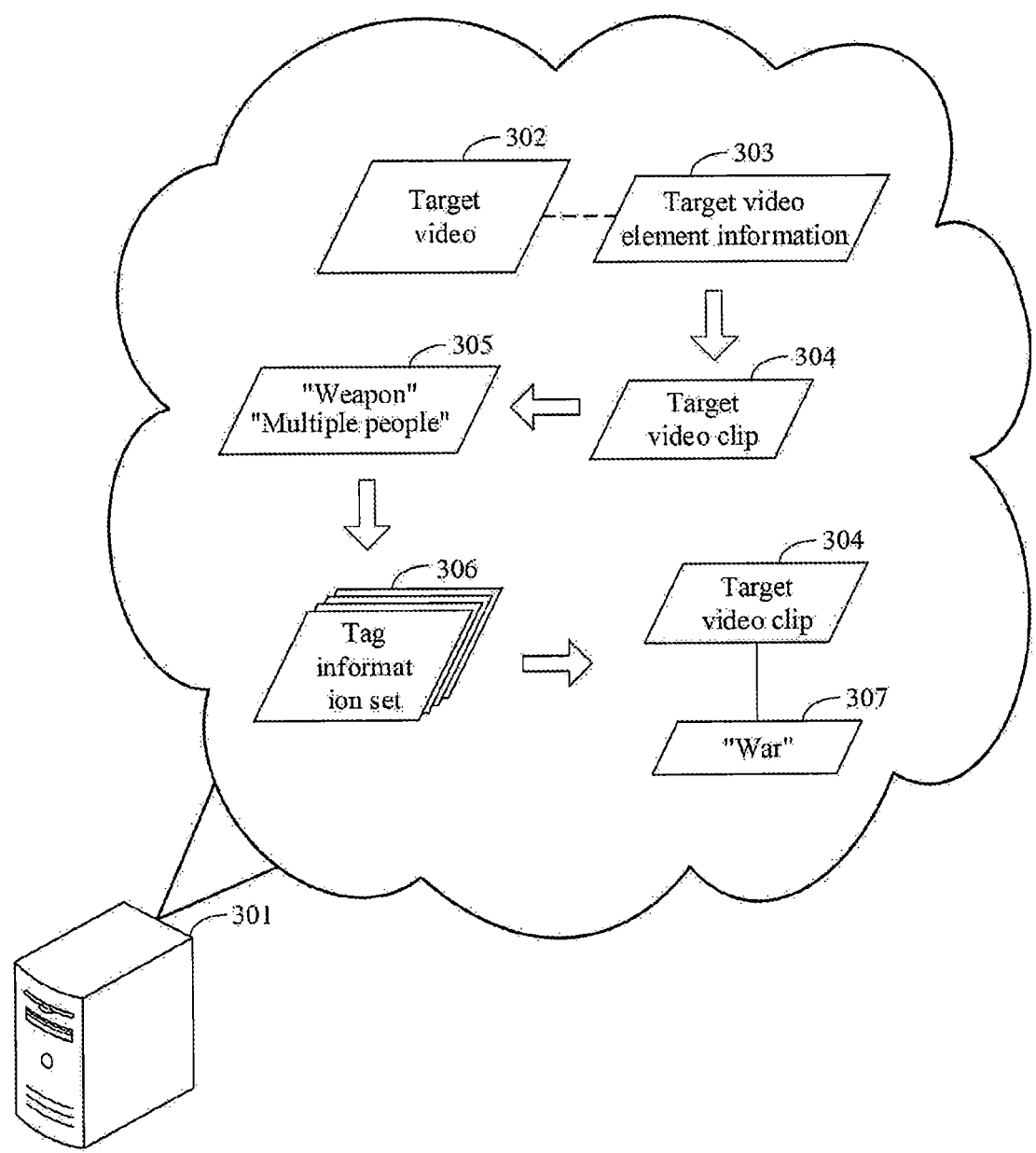
FIG. 3 is a schematic diagram of an application scenario of the method for processing a video according to the present disclosure.

Further referring to FIG. 3, FIG. 3 is a schematic diagram of an application scenario of the method for processing a video according to this embodiment. In the application scenario of FIG. 3, the server 301 first locally acquires the target video 302 (e.g., a certain movie) and the target video element information 303 of the target video 302. The target video element information 303 is an image frame included in the target video. Then, the server 301 recognizes each image frame, and determines a video clip corresponding to image frames including a weapon image and at least two person images as the target video clip 304. Subsequently, based on the preset corresponding relationship between the video element information and the keyword determining method for the video clip, the server 301 obtains the keyword representing the category of the target video clip. The keyword determining method is to determine the recognition result for the image frame included in the target video clip (i.e., "weapon" and "multiple people") as the keyword 305 of the target video clip. Finally, the server 301 matches the keyword 305 with the preset tag information set. In the tag information set, when the tag information subset marked as "war" includes the keyword, the tag information of the target video clip 304 is determined as "war" (i.e., 307 in the figure). At last, the server 301 associates and stores the target video clip 304 and the tag information 307 onto a storage device of the server 301.

According to the method provided by the above embodiment of the present disclosure, the target video clip is extracted from the target video by using the target video element information of the target video. Then, the keyword of the target video clip is obtained based on a preset keyword determining method. Finally, the keyword is matched with the preset tag information set to obtain the tag information of the target video clip, and the target video clip and the tag information are associated and stored. Thus, improving the accuracy of adding the tag information to the video clip, and enriching the means of adding the tag information to the video clip.

Figure 4:
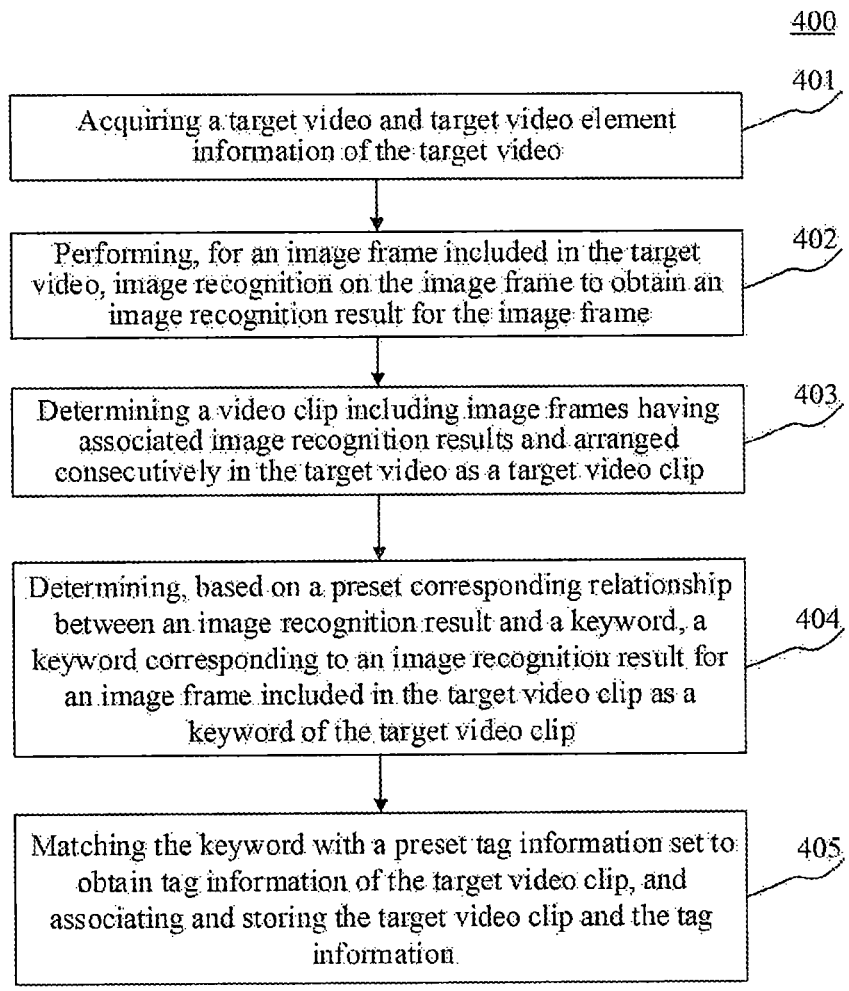
FIG. 4 is a flowchart of another embodiment of the method for processing a video according to the present disclosure.

Further referring to FIG. 4, a flow 400 of another embodiment of the method for processing a video is illustrated. The flow 400 of the method for processing a video includes the following steps.

Step 401, acquiring a target video and target video element information of the target video.

In this embodiment, an executing body (e.g., the server shown in FIG. 1) of the method for processing the video may remotely or locally acquire the target video and the target video element information of the target video by means of a wired connection or a wireless connection. The target video may be a video in a certain preset video set. The video element information may be various kinds of information (e.g., subtitle, dubbing, image frame, name and playing time) corresponding to the target video, and the target video element information may include at least one kind of information in the various kinds of information.

In this embodiment, the target video element information is an image frame included in the target video.

Step 402, performing, for an image frame included in the target video, image recognition on the image frame to obtain an image recognition result for the image frame.

In this embodiment, for the image frame included in the target video, the executing body may perform the image recognition on the image frame to obtain the image recognition result for the image frame. The image recognition result may be related information of an image, such as an object image or a scene image, included in the image frame, for example, the number of objects or a category of a scene. It should be noted that the image recognition result may be obtained based on an existing image recognition method (e.g., a method based on a neural network, a method based on fractal features), and the image recognition method is a well-known technology widely studied and applied at present, which will not be repeatedly described herein.

Step 403, determining a video clip including image frames having associated image recognition results and arranged consecutively in the target video as a target video clip.

In this embodiment, based on the image recognition result obtained in step 402, the executing body may determine the video clip including the image frames having the associated image recognition results and arranged consecutively in the target video as the target video clip. Whether the image recognition results are associated with each other may be determined based on a condition preset by a technician.

As an example, the image recognition result may be the category of an object included in the image frame and the number of people included in the image frame. Assuming that the condition preset by the technician is that the image frames include a weapon image and at least two person images. The executing body may determine the image recognition results representing the weapon image and the at least two person images as the associated image recognition results. Then, the executing body may determine the video clip including the image frames corresponding to the associated image recognition results and arranged consecutively in the target video as the target video clip.

As another example, the image recognition result may be positional information of a target object included in the image frame. Assuming that the target object is a football, the executing body may recognize the football from the image frame, and recognize the position of the football in the football field, for example, determine the position of the football based on an image of a sideline of the football field in the image frame. The condition preset by the technician is that the image recognition result corresponding to the image frame represents that the image frame includes a football image and the position of the football is within the goal. Thus, the executing body may determine an image recognition result meeting the condition as a target image recognition result, determine, in the target video, the time period of the image frame corresponding to the target image recognition result, then determine image recognition results for image frames in preset time periods before and after the time period, and determine the target image recognition result and the determined image recognition results as the associated image recognition results. Finally, the video clip including the image frames corresponding to the associated image recognition results is determined as the target video clip.

The target video clip is extracted by recognizing the image frames included in the target video, which may make the process of extracting the target video clip quicker and more accurate, and is conducive to improving the pertinence of extracting the target video clip.

Step 404, determining, based on a preset corresponding relationship between an image recognition result and a keyword, a keyword corresponding to an image recognition result for an image frame included in the target video clip as a keyword of the target video clip.

In this embodiment, based on the preset corresponding relationship between the image recognition result and the keyword, the executing body may determine the keyword corresponding to the image recognition result for the image frame included in the target video clip as the keyword of the target video clip. As an example, the corresponding relationship between the image recognition result and the keyword may be represented by a preset corresponding relationship table or a preset data structure (e.g., a linked list). The image recognition result may be a name of an object image included in an image frame, and the keyword corresponding to the image recognition result may be a category keyword representing the category to which the name of the object image belongs. For example, in the target video clip, some image frames include a gun image, and some image frames include a cannon image. Based on the corresponding relationship table, it may be determined that the keywords of the image frames including the gun image and the image frames including the cannon image include "weapon." In addition, when each image frame in the target video clip includes at least two person images, it may be determined that the keyword of each image frame includes "multiple people." The finally determined keywords of the target video clip may include "weapon" and "multiple people."

Step 405, matching the keyword with a preset tag information set to obtain tag information of the target video clip, and associating and storing the target video clip and the tag information.

In this embodiment, step 405 is substantially the same as step 204 in the corresponding embodiment of FIG. 2, which will not be repeatedly described here.

It may be seen from FIG. 4 that, as compared with the embodiment corresponding to FIG. 2, the flow 400 of the method for processing a video in this embodiment emphasizes the step of recognizing the image frames included in the target video to obtain the keyword of the target video clip, thereby improving the efficiency and accuracy of the determination of the tag information of the target video clip.

Figure 5:
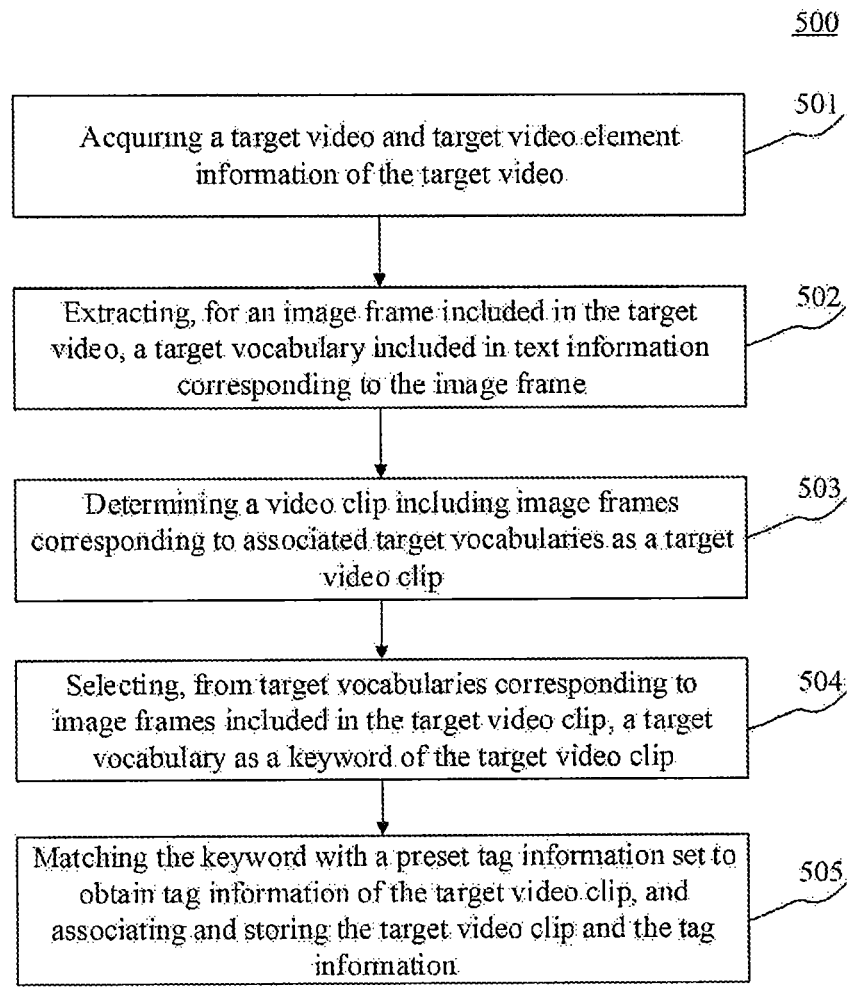
FIG. 5 is a flowchart of another embodiment of the method for processing a video according to the present disclosure.

Further referring to FIG. 5, a flow 500 of another embodiment of the method for processing a video is illustrated. The flow 500 of the method for processing a video includes the following steps.

Step 501, acquiring a target video and target video element information of the target video.

In this embodiment, an executing body (e.g., the server shown in FIG. 1) of the method for processing the video may remotely or locally acquire the target video and the target video element information of the target video by means of a wired connection or a wireless connection. The target video may be a video in a certain preset video set. The video element information may be various kinds of information (e.g., subtitle, dubbing, image frame, name and playing time) corresponding to the target video, and the target video element information may include at least one kind of information in the various kinds of information.

In this embodiment, the target video element information is a set of text information corresponding to an image frame included in the target video. Specifically, each piece of text information in the set of text information may correspond to at least one image frame included in the target video. As an example, the text information may be subtitle information (which may be information extracted from a preset subtitle file, or text information obtained by performing text recognition on the image frame), text information obtained by performing recognition on a text image included in the image frame, or the like.

Step 502, extracting, for image frames included in the target video, target vocabularies included in text information corresponding to the image frames.

In this embodiment, for the image frame included in the target video, the executing body may extract the target vocabulary included in the text information corresponding to the image frame. As an example, assuming that the text information is subtitles included in a video frame, the target vocabulary may be a vocabulary, in at least one vocabulary extracted from the subtitles, and belonging to a preset category. For example, the preset category may be an emotion category. The target vocabulary may be a vocabulary representing an emotion such as "hate," "like," and "happiness."

It should be noted that the target vocabulary may be obtained based on an existing text recognition method (e.g., a neural network based text extraction model, and a corresponding relationship table based on a vocabulary category and a vocabulary), and the text recognition method is the well-known technology widely studied and applied at present, which will not be repeatedly described here.

Step 503, determining a video clip including image frames corresponding to associated target vocabularies as a target video clip.

In this embodiment, based on the target vocabulary obtained in step 502, the executing body may determine the video clip including the image frames corresponding to the associated target vocabularies as the target video clip. Whether the target vocabularies are associated with each other may be determined based on a condition preset by a technician.

As an example, it is assumed that the condition preset by the technician is that the target vocabulary corresponding to the image frame belongs to vocabularies of a war category. The executing body may determine image frames corresponding to a vocabulary meeting the condition as associated image frames. Alternatively, the executing body may determine the image frames corresponding to the vocabulary meeting the condition and an image frame, which time in the target video is between the image frames, as associated image frames. Then, the video clip including the associated image frames is determined as the target video clip.

The target vocabulary included in the text information is extracted to extract the target video clip, which may further enhance the flexibility of the extraction for the target video clip, and is conducive to improving the pertinence of the target video clip.

Step 504, selecting, from target vocabularies corresponding to image frames included in the target video clip, a target vocabulary as a keyword of the target video clip.

In this embodiment, the executing body may select, from the target vocabularies corresponding to the image frames included in the target video clip, a target vocabulary as the keyword of the target video clip. As an example, if the target vocabularies corresponding to the image frames in the target video clip are vocabularies belonging to the war category, the executing body may extract, from the target vocabularies, a preset number of target vocabularies in various ways (for example, a random selection way, and away to select in an order of occurrences of the target vocabularies) as keywords of the target video clip. For example, the extracted keywords may include "offensive," "rushing," "firing," and the like.

Step 505, matching the keyword with a preset tag information set to obtain tag information of the target video clip, and associating and storing the target video clip and the tag information.

In this embodiment, step 505 is substantially the same as step 204 in the corresponding embodiment of FIG. 2, which will not be repeatedly described here.

It may be seen from FIG. 5 that, as compared with the embodiment corresponding to FIG. 2, the flow 500 of the method for processing a video in this embodiment emphasizes the step of recognizing the text information corresponding to an image frame included in the target video to obtain a keyword of the target video clip, which helps to improve the flexibility and accuracy of the determination of the tag information of the target video clip.

Figure 6:
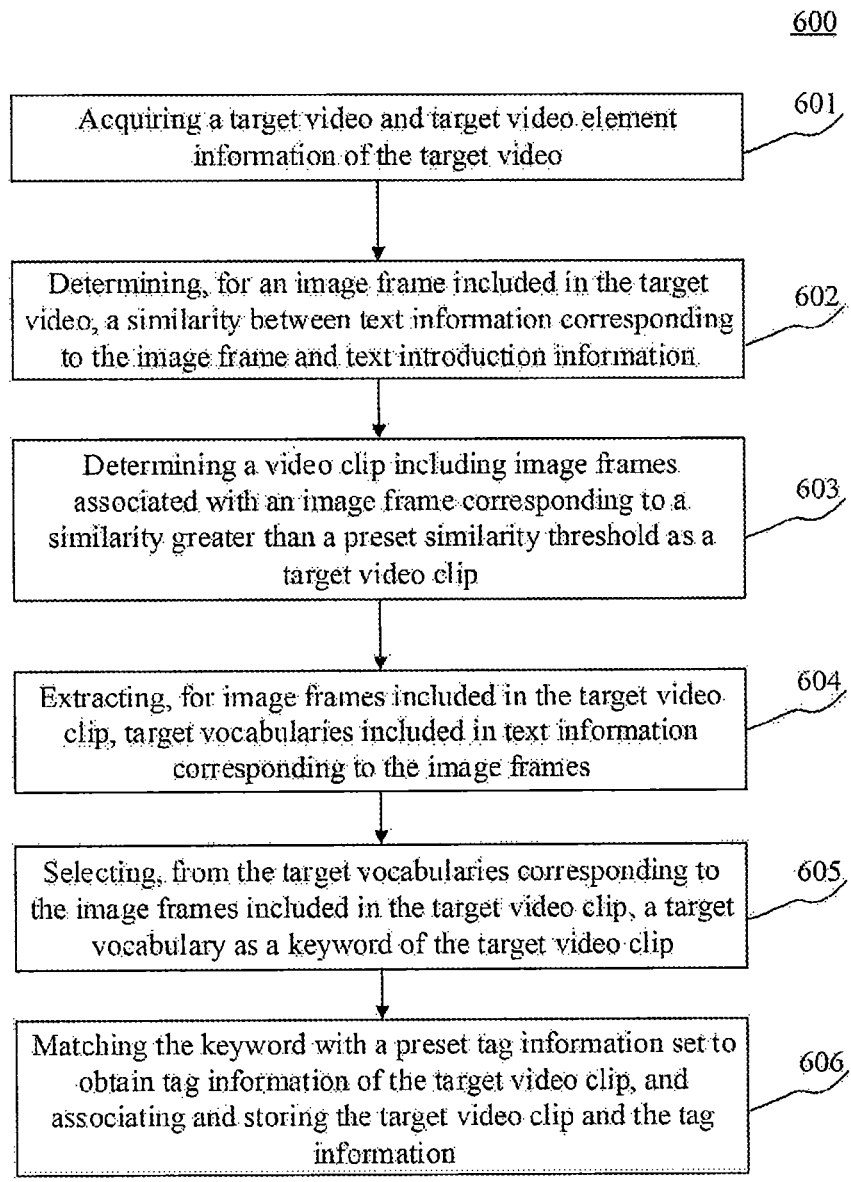
FIG. 6 is a flowchart of another embodiment of the method for processing a video according to the present disclosure.

Further referring to FIG. 6, a flow 600 of another embodiment of the method for processing a video is illustrated. The flow 600 of the method for processing a video includes the following steps.

Step 601, acquiring a target video and target video element information of the target video.

In this embodiment, an executing body (e.g., the server shown in FIG. 1) of the method for processing a video may remotely or locally acquire the target video and the target video element information of the target video by means of a wired connection or a wireless connection. The target video may be a video in a certain preset video set. The video element information may be various kinds of information (e.g., subtitle, dubbing, image frame, name and playing time) corresponding to the target video, and the target video element information may include at least one kind of information in the various kinds of information.

In this embodiment, the target video element information includes a set of text information corresponding to an image frame included in the target video, and text introduction information for the target video. Specifically, each piece of text information in the set of text information may correspond to at least one image frame included in the target video. As an example, the text information may be subtitle information (which may be information extracted from a preset subtitle file, or text information obtained by performing text recognition on the image frame), text information obtained by performing recognition on a text image included in the image frame, or the like.

Step 602, determining, for an image frame included in the target video, a similarity between text information corresponding to the image frame and text introduction information.

In this embodiment, for the image frame included in the target video, the executing body may determine the similarity between the text information corresponding to the image frame and the text introduction information. The method of calculating the similarity between text information and the text introduction information may include, but not limited to, at least one of: a method on the basis of calculating a Jaccard similarity coefficient, or a method based on a cosine similarity. The method of calculating the similarity is a well-known technology widely studied and applied at present, which will not be repeatedly described here.

Step 603, determining a video clip including image frames associated with an image frame corresponding to a similarity greater than a preset similarity threshold as a target video clip.

In this embodiment, based on the similarity obtained in step 602, the executing body may determine the video clip including the image frames associated with an image frame corresponding to the similarity greater than the preset similarity threshold as the target video clip. The image frames associated with the image frame corresponding to the similarity greater than the preset similarity threshold may include: image frames corresponding to similarities greater than the preset similarity threshold, and an image frame which playing time is between the image frames. Alternatively, the image frames associated with the image frame corresponding to the similarity greater than the preset similarity threshold may include: image frames corresponding to similarities greater than the preset similarity threshold, an image frame which playing time is between the various image frames, and a preset number of image frames before and after the image frames. As an example, in the target video, if the similarities corresponding to the image frame at the 30th second, the image frame at the 35th second, and the image frame at the 50th second are greater than the similarity threshold, the video clip between the time period from the 30th second to the 50th second is the target video clip. Alternatively, if the preset number is 500, the target image frames include an image frame between the time period from the 30th second to the 50th second, and 500 image frames before and after the image frame between the time period from the 30th second to the 50th second.

Step 604, extracting, for image frames included in the target video clip, target vocabularies included in text information corresponding to the image frames.

In this embodiment, the method for extracting the target vocabulary included in the text information corresponding to an image frame may be the same as step 502, which will not be repeatedly described here.

Step 605, selecting, from the target vocabularies corresponding to the image frames included in the target video clip, a target vocabulary as a keyword of the target video clip.

In this embodiment, the method for selecting, from the target vocabularies corresponding to the image frames included in the target video clip, a target vocabulary as the keyword of the target video clip may be the same as step 504, which will not be repeatedly described here.

Step 606, matching the keyword with a preset tag information set to obtain tag information of the target video clip, and associating and storing the target video clip and the tag information.

In this embodiment, step 606 is substantially the same as step 204 in the corresponding embodiment of FIG. 2, which will not be repeatedly described here.

It may be seen from FIG. 6 that, as compared with the embodiment corresponding to FIG. 2, the flow 600 of the method for processing a video in this embodiment emphasizes the step of calculating the similarity between the text information and the text introduction information, which helps to improve the pertinence of extracting the target video clip.

Figure 7:
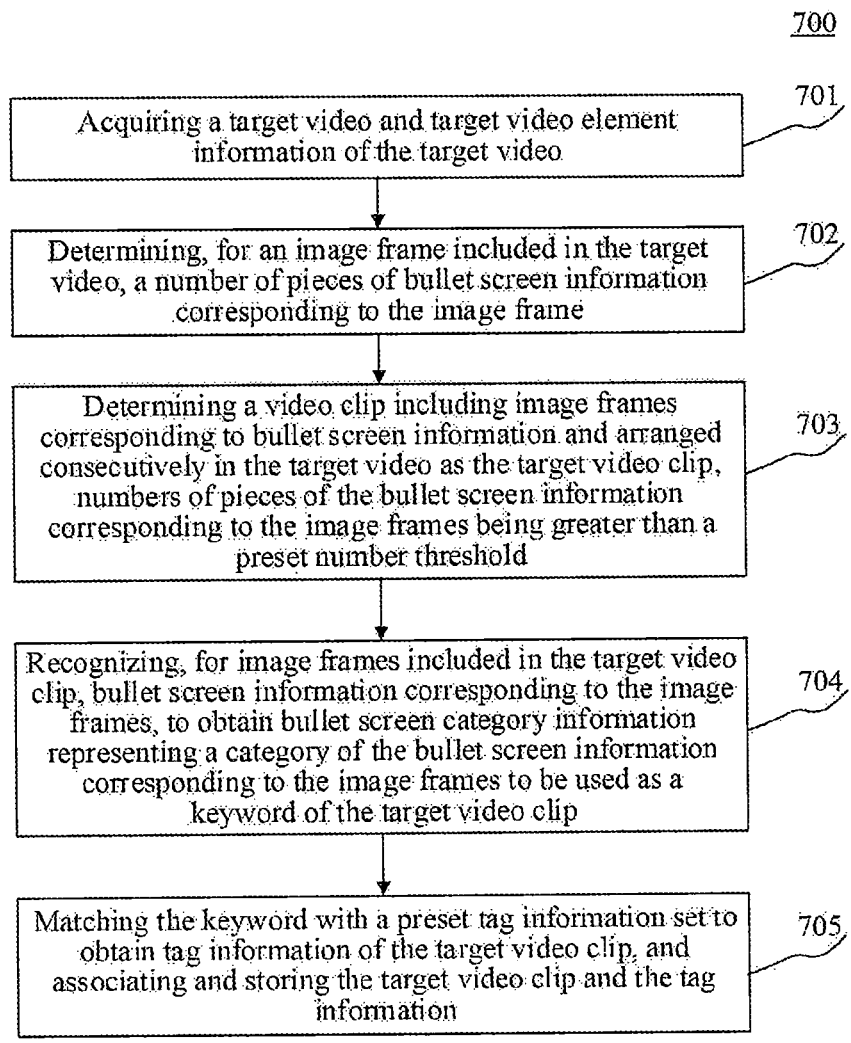
FIG. 7 is a flowchart of another embodiment of the method for processing a video according to the present disclosure.

Further referring to FIG. 7, a flow 700 of another embodiment of the method for processing a video is illustrated. The flow 700 of the method for processing a video includes the following steps.

Step 701, acquiring a target video and target video element information of the target video.

In this embodiment, an executing body (e.g., the server shown in FIG. 1) of the method for processing a video may remotely or locally acquire the target video and the target video element information of the target video by means of a wired connection or a wireless connection. The target video may be a video in a certain preset video set. The video element information may be various kinds of information (e.g., subtitle, dubbing, image frame, name and playing time) corresponding to the target video, and the target video element information may include at least one kind of information in the various kinds of information.

In this embodiment, the target video element information is a set of bullet screen information corresponding to an image frame included in the target video. Specifically, the bullet screen information may be text information obtained by recognizing a bullet screen text for the image frame. As an example, the executing body may recognize the bullet screen in the image frame using an existing Optical Character Recognition (OCR) technology, to obtain the bullet screen information.

Step 702, determining, for an image frame included in the target video, a number of pieces of bullet screen information corresponding to the image frame.

In this embodiment, for an image frame included in the target video, the executing body may determine the number of pieces of the bullet screen information corresponding to the image frame.

Step 703, determining a video clip including image frames corresponding to bullet screen information and arranged consecutively in the target video as the target video clip, numbers of pieces of the bullet screen information corresponding to the image frames being greater than a preset number threshold.

In this embodiment, the executing body may determine the video clip including the image frames corresponding to the bullet screen information and arranged consecutively in the target video as the target video clip, the numbers of pieces of the bullet screen information corresponding to the image frames being greater than the preset number threshold. The number threshold may be a number set in various ways. For example, the number threshold may be a number set by a technician based on experience, or a result calculated by the executing body by dividing a total number of pieces of the bullet screen information of the target video by the number of the image frames included in the target video. In practice, an image frame having a number of pieces of corresponding bullet screen information greater than the number threshold may be considered as an image frame to which most users pay attention. Thus, it may be considered that the target video clip is a video clip paid more attention to.

Step 704, recognizing, for image frames included in the target video clip, bullet screen information corresponding to the image frames, to obtain bullet screen category information representing a category of the bullet screen information corresponding to the image frames as a keyword of the target video clip.

In this embodiment, for the image frame included in the target video clip, the executing body may recognize the bullet screen information corresponding to the image frame, to obtain the bullet screen category information representing the category of the bullet screen information corresponding to the image frame as the keyword of the target video clip. Specifically, the executing body may obtain the bullet screen category information in various ways. As an example, the executing body may obtain the bullet screen category information using a preset bullet screen classification model. The bullet screen classification model may be a corresponding relationship table that is pre-established by the technician based on statistics on a large amount of text information and the category information of the text information, and stores a plurality of corresponding relationships between the text information and the category information. Alternatively, the bullet screen classification model may also be a model for classifying texts that is obtained by performing supervised training based on an existing artificial neural network (e.g., a convolutional neural network).

Step 705, matching the keyword with a preset tag information set to obtain tag information of the target video clip, and associating and storing the target video clip and the tag information.

In this embodiment, the executing body may first match the keyword with the preset tag information set to obtain the tag information of the target video clip, and then associate and store the target video clip and the tag information. As an example, the tag information set may include at least one subset, and each subset may be a set of a series of related tag information. For example, a certain subset includes the following tag information: "war," "battle," "weapon," etc. When the keyword of the target video clip is contained in the tag information included in the subset, at least one piece of tag information (e.g., "war") in the subset may be determined as the tag information of the target video clip.

As another example, the tag information set may include a first subset and a second subset. The first subset includes tag information of positive evaluation and the second subset includes tag information of negative evaluation. The executing body may determine whether the bullet screen category information belongs to the first subset or the second subset. If the bullet screen information belongs to the first subset, the tag information of the target video clip is set to first information (e.g., "positive evaluation"). If the bullet screen information belongs to the second subset, the tag information of the target video clip is set to second information (e.g., "negative evaluation").

It may be seen from FIG. 7 that, as compared with the embodiment corresponding to FIG. 2, the flow 700 of the method for processing a video in this embodiment emphasizes the step of extracting the target video clip by recognizing the number of pieces of bullet screen information, and the step of determining the tag information of the target video clip based on the bullet screen category information, which helps to enhance the pertinence of extracting the target video clip, and improve the accuracy of the determination of the tag information of the target video clip.

Figure 8:
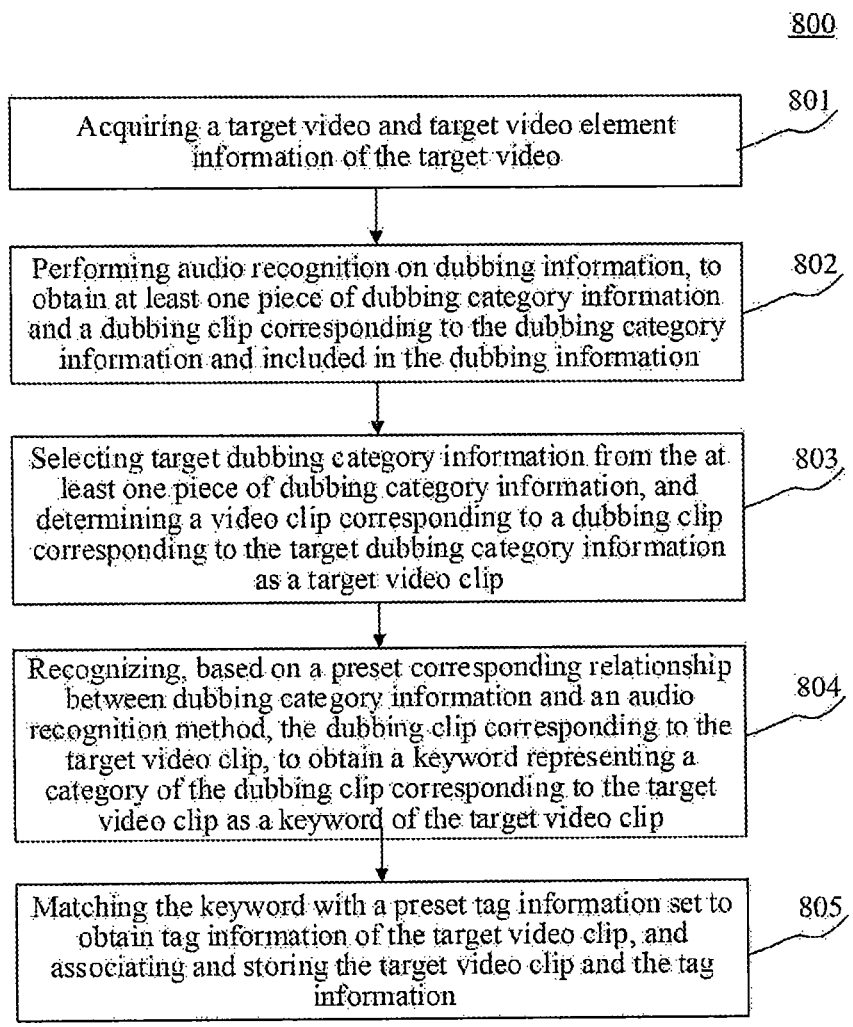
FIG. 8 is a flowchart of another embodiment of the method for processing a video according to the present disclosure.

Further referring to FIG. 8, a flow 800 of another embodiment of the method for processing a video is illustrated. The flow 800 of the method for processing a video includes the following steps.

Step 801, acquiring a target video and target video element information of the target video.

In this embodiment, an executing body (e.g., the server shown in FIG. 1) of the method for processing a video may remotely or locally acquire the target video and the target video element information of the target video by means of a wired connection or a wireless connection. The target video may be a video in a certain preset video set. The video element information may be various kinds of information (e.g., subtitle, dubbing, image frame, name and playing time) corresponding to the target video, and the target video element information may include at least one kind of information in the various kinds of information.

In this embodiment, the target video element information is the dubbing information of the target video.

Step 802, performing audio recognition on dubbing information, to obtain at least one piece of dubbing category information and a dubbing clip corresponding to the dubbing category information and included in the dubbing information.

In this embodiment, the executing body may perform the audio recognition on the dubbing information, to obtain the at least one piece of dubbing category information and the dubbing clip corresponding to the dubbing category information and included in the dubbing information. The dubbing category information is used to represent the category of the corresponding dubbing clip. The executing body may extract at least one dubbing clip from the dubbing information using an existing audio recognition technology. For example, the executing body may extract a dubbing clip of a music category from the dubbing information, and the category information of the dubbing clip may be "music." The executing body may also extract a dubbing clip of a speech category, and the category information of the dubbing clip may be "speech."

Step 803, selecting target dubbing category information from the at least one piece of dubbing category information, and determining a video clip corresponding to a dubbing clip corresponding to the target dubbing category information as a target video clip.

In this embodiment, the executing body may first select the target dubbing category information from the at least one piece of dubbing category information in various ways, for example, select the target dubbing category information randomly, or select the target dubbing category information in an order of the extracted dubbing clips. Then, the video clip corresponding to the dubbing clip corresponding to the target dubbing category information is determined as the target video clip.

As an example, assuming that the target dubbing category information is "music" and the dubbing clip which category information is "music" includes the dubbing clip A and the dubbing clip B, then the dubbing clip A and the dubbing clip B may be respectively determined as the target video clip.

Step 804, recognizing, based on a preset corresponding relationship between dubbing category information and an audio recognition method, the dubbing clip corresponding to the target video clip, to obtain a keyword representing a category of the dubbing clip corresponding to the target video clip as a keyword of the target video clip.

In this embodiment, based on the preset corresponding relationship between the dubbing category information and the audio recognition method, the executing body may recognize the dubbing clip corresponding to the target video clip, to obtain the keyword representing the category of the dubbing clip corresponding to the target video clip as the keyword of the target video clip. The preset corresponding relationship between the dubbing category information and the audio recognition method may be represented by a preset program list, and a program in the program list may correspond to the dubbing category information. The executing body may execute a corresponding program automatically or according to an operation of a technician. The keyword may be the name of a piece of music, a target vocabulary extracted from a text obtained by performing speech recognition, or the like. The audio recognition method is a well-known technology widely studied and applied at present, which will not be repeatedly described here.

As an example, assuming that the dubbing clip corresponding to the target video clip is a piece of music, the keyword representing the category of the dubbing clip may be the name of the piece of music. As another example, assuming that the dubbing clip corresponding to the target video clip is speech, the executing body may first perform speech recognition on the dubbing clip to obtain text information, and then extract a target vocabulary from the text information as the keyword representing the category of the dubbing clip. The method for extracting the target vocabulary from the text information may be the same as the method described in step 502, which will not be repeatedly described here.

Step 805, matching the keyword with a preset tag information set to obtain tag information of the target video clip, and associating and storing the target video clip and the tag information.

In this embodiment, step 805 is substantially the same as step 204 in the corresponding embodiment of FIG. 2, which will not be repeatedly described here.

It may be seen from FIG. 8 that, as compared with the embodiment corresponding to FIG. 2, the flow 800 of the method for processing a video in this embodiment emphasizes the step of recognizing the dubbing information to obtain the target video clip, and the step of recognizing the dubbing clip corresponding to the target video clip to obtain the keyword of the target video clip, which helps to enhance the pertinence of extracting the target video clip, and improve the accuracy of the determination of the tag information of the target video clip.

Figure 9:
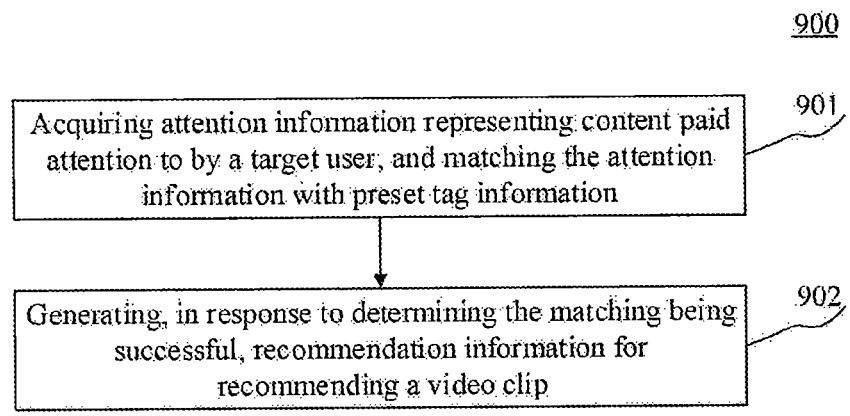
FIG. 9 is a flowchart of an embodiment of a method for generating recommendation information according to the present disclosure.

Further referring to FIG. 9, a flow 900 of an embodiment of a method for generating recommendation information according to the present disclosure is illustrated. The method for generating recommendation includes the following steps.

Step 901, acquiring attention information representing content paid attention to by a target user, and matching the attention information with preset tag information.

In this embodiment, an executing body (e.g., the server shown in FIG. 1) of the method for generating recommendation information may first remotely or locally acquire the attention information representing the content paid attention to by the target user by means of a wired connection or a wireless connection. The target user may be a user in a certain preset user list or in a certain user set (e.g., a registered user of a certain website), or may be a user satisfying certain conditions (e.g., who has browsed certain videos). In this embodiment, the tag information may be obtained according to the method described in any of the embodiments of FIG. 2 to FIG. 8, and the tag information has a corresponding video clip. The attention information may be information associated with the target user. For example, the attention information of the target user may be included in the user portrait information of the target user. Alternatively, the attention information of the target user may be included in the historical browsing record of the target user.

Then, the executing body matches the attention information with the preset tag information. Specifically, when the preset tag information is completely or partially identical to the attention information of the target user, it may be determined that the attention information is successfully matched with the tag information. For example, when the preset tag information includes "war" and "massacre," and the attention information of the target user includes "war" and "weapon," it is determined that the attention information is successfully matched with the tag information.

Step 902, generating, in response to determining the matching being successful, recommendation information for recommending a video clip.

In this embodiment, in response to determining that the matching is successful, the executing body may generate the recommendation information for recommending the video clip corresponding to the tag information. As an example, the recommendation information may include the tag information and a link of the video clip corresponding to the tag information, and may further include information such as a link of the video of the video clip.

Optionally, the executing body may send the generated recommendation information to the terminal device used by the target user.

According to the method provided by the above embodiments of the present disclosure, by matching the attention information of the target user with the preset tag information, the recommendation information for recommending the video clip is generated. The tag information is obtained using the method described in any one of the embodiments of FIG. 2 to FIG. 8, which enhances the pertinence of generating the recommendation information.

Figure 10:
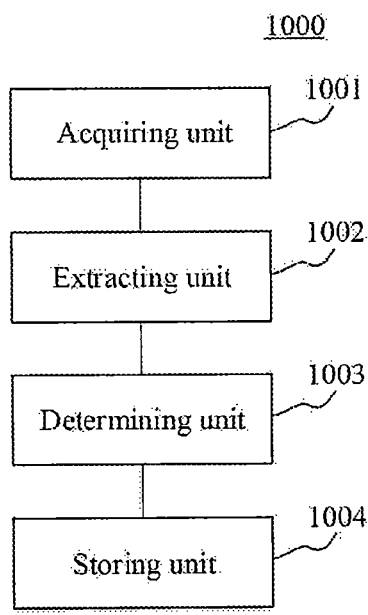
FIG. 10 is a schematic structural diagram of an embodiment of an apparatus for processing a video according to the present disclosure.

Further referring to FIG. 10, as an implementation of the method shown in the above figures, the present disclosure provides an embodiment of an apparatus for processing a video. The embodiment of the apparatus corresponds to the embodiment of the method shown in FIG. 2, and the apparatus may be applied in various electronic devices.

As shown in FIG. 10, the apparatus 1000 for processing a video in this embodiment includes: an acquiring unit 1001, configured to acquire a target video and target video element information of the target video; an extracting unit 1002, configured to extract, based on the target video element information, a target video clip from the target video; a determining unit 1003, configured to obtain, based on a preset corresponding relationship between video element information and a keyword determining method for a video clip, a keyword representing a category of the target video clip; and a storing unit 1004, configured to match the keyword with a preset tag information set to obtain tag information of the target video clip, and associate and store the target video clip and the tag information.

In this embodiment, the acquiring unit 1001 may remotely or locally acquire the target video and the target video element information of the target video by means of a wired connection or a wireless connection. The target video may be a video in a certain preset video set (e.g., a video provided by a certain video website). The video element information may be various kinds of information (e.g., subtitle, dubbing, image frame, name and playing time) corresponding to the target video, and the target video element information may include at least one kind of information in the various kinds of information.

In this embodiment, based on the target video element information acquired by the acquiring unit 1001, the extracting unit 1002 may extract the target video clip from the target video. Specifically, the extracting unit 1002 may extract the target video clip from the target video in various ways. For example, when the target video element information is an image frame included in the target video, the extracting unit 1002 may recognize each image frame to obtain a category of an object image included in the each image frame, and determine a video clip corresponding to image frames of the same category (e.g., image frames including a weapon image) as the target video clip.

In this embodiment, the determining unit 1003 may obtain the keyword representing the category of the target video clip based on the preset corresponding relationship between video element information and a keyword determining method for the video clip. The corresponding relationship between the video element information and the keyword determining method may be represented by a preset program list, and a program in the program list may correspond to at least one piece of video element information.

In this embodiment, the storing unit 1004 may match the keyword with the preset tag information set to obtain the tag information of the target video clip, and associate and store the target video clip and the tag information. The tag information set may include at least one subset, and each subset may be a set of a series of related tag information. For example, a certain subset includes the following tag information: "war," "battle," "weapon," etc. When the keyword of the target video clip is contained in the tag information included in the subset, at least one piece of tag information (e.g., "war") in the subset may be determined as the tag information of the target video clip.

In some alternative implementations of this embodiment, the target video element information is an image frame included in the target video. The extracting unit includes: a first recognizing module (not shown in the figure), configured to perform, for the image frame included in the target video, image recognition on the image frame to obtain an image recognition result for the image frame; and a first determining module (not shown in the figure), configured to determine a video clip including image frames having associated image recognition results and arranged consecutively in the target video as the target video clip.

In some alternative implementations of this embodiment, the determining unit is further configured to determine, based on a preset corresponding relationship between the image recognition result and the keyword, the keyword corresponding to the image recognition result for the image frame included in the target video clip as the keyword of the target video clip.

In some alternative implementations of this embodiment, the target video element information is a set of text information corresponding to an image frame included in the target video. The extracting unit includes: a first extracting module (not shown in the figure), configured to extract, for the image frame included in the target video, a target vocabulary included in the text information corresponding to the image frame; and a second determining module (not shown in the figure), configured to determine a video clip including image frames corresponding to associated target vocabularies as the target video clip.

In some alternative implementations of this embodiment, the determining unit is further configured to select, from target vocabularies corresponding to image frames included in the target video clip, a target vocabulary as the keyword of the target video clip.

In some alternative implementations of this embodiment, the target video element information includes a set of text information corresponding to an image frame included in the target video, and text introduction information for the target video. The extracting unit includes: a third determining module (not shown in the figure), configured to determine, for the image frame included in the target video, a similarity between the text information corresponding to the image frame and the text introduction information; and a fourth determining module (not shown in the figure), configured to determine a video clip including image frames associated with an image frame corresponding to a similarity greater than a preset similarity threshold as the target video clip.

In some alternative implementations of this embodiment, the determining unit includes: a second extracting module (not shown in the figure), configured to extract, for image frames included in the target video clip, target vocabularies included in text information corresponding to the image frames; and a first selecting module (not shown in the figure), configured to select, from the target vocabularies corresponding to the image frames included in the target video clip, a target vocabulary as a keyword of the target video clip.

In some alternative implementations of this embodiment, the target video element information is a set of bullet screen information corresponding to an image frame included in the target video. The extracting unit includes: a fifth determining module (not shown in the figure), configured to determine, for the image frame included in the target video, a number of pieces of the bullet screen information corresponding to the image frame; and a sixth determining module (not shown in the figure), configured to determine a video clip including image frames corresponding to bullet screen information and arranged consecutively in the target video as the target video clip, numbers of pieces of the bullet screen information corresponding to the image frames being greater than a preset number threshold.

In some alternative implementations of this embodiment, the determining unit is further configured to recognize, for image frames included in the target video clip, the bullet screen information corresponding to the image frames, to obtain bullet screen category information representing a category of the bullet screen information corresponding to the image frames as a keyword of the target video clip.

In some alternative implementations of this embodiment, the target video element information is dubbing information of the target video. The extracting unit includes: a second recognizing module (not shown in the figure), configured to perform audio recognition on the dubbing information, to obtain at least one piece of dubbing category information and a dubbing clip corresponding to the dubbing category information and included in the dubbing information, the dubbing category information representing a category of the corresponding dubbing clip; and a second selecting module (not shown in the figure), configured to select target dubbing category information from the at least one piece of dubbing category information, and determine a video clip corresponding to a dubbing clip corresponding to the target dubbing category information as the target video clip.

In some alternative implementations of this embodiment, the determining unit is further configured to recognize, based on a preset corresponding relationship between dubbing category information and an audio recognition method, the dubbing clip corresponding to the target video clip, to obtain a keyword representing a category of the dubbing clip corresponding to the target video clip as a keyword of the target video clip.

The apparatus for processing a video provided by the above embodiment of the present disclosure extracts the target video clip from the target video by using the target video element information of the target video, and then obtains the keyword of the target video clip based on a preset keyword determining method. Finally, the apparatus matches the keyword with the preset tag information set to obtain the tag information of the target video clip, and associates and stores the target video clip and the tag information. Thus improving the accuracy of adding the tag information to the video clip, and enriching the means of adding the tag information to the video clip.

Figure 11:
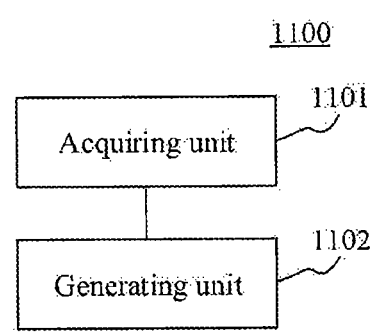
FIG. 11 is a schematic structural diagram of an embodiment of an apparatus for generating recommendation information according to the present disclosure.

Further referring to FIG. 11, as an implementation of the method shown in the above figures, the present disclosure provides an embodiment of an apparatus for generating recommendation information. The embodiment of the apparatus corresponds to the embodiment of the method shown in FIG. 9, and the apparatus may be applied in various electronic devices.

As shown in FIG. 11, the apparatus 1100 for generating recommendation information in this embodiment includes: an acquiring unit 1101, configured to acquire attention information representing content paid attention to by a target user, and match the attention information with preset tag information, the tag information being obtained according to the method described in any one of the embodiments of FIG. 2 to FIG. 8, and having a corresponding video clip; and a generating unit 1102, configured to generate, in response to determining the matching being successful, recommendation information for recommending the video clip.

The apparatus provided by the above embodiment of the present disclosure matches the attention information of the target user with the preset tag information, to generate the recommendation information for recommending the video clip. The tag information is obtained using the method described in any one of the embodiments of FIG. 2 to FIG. 8, which enhances the pertinence of generating the recommendation information.

Figure 12:
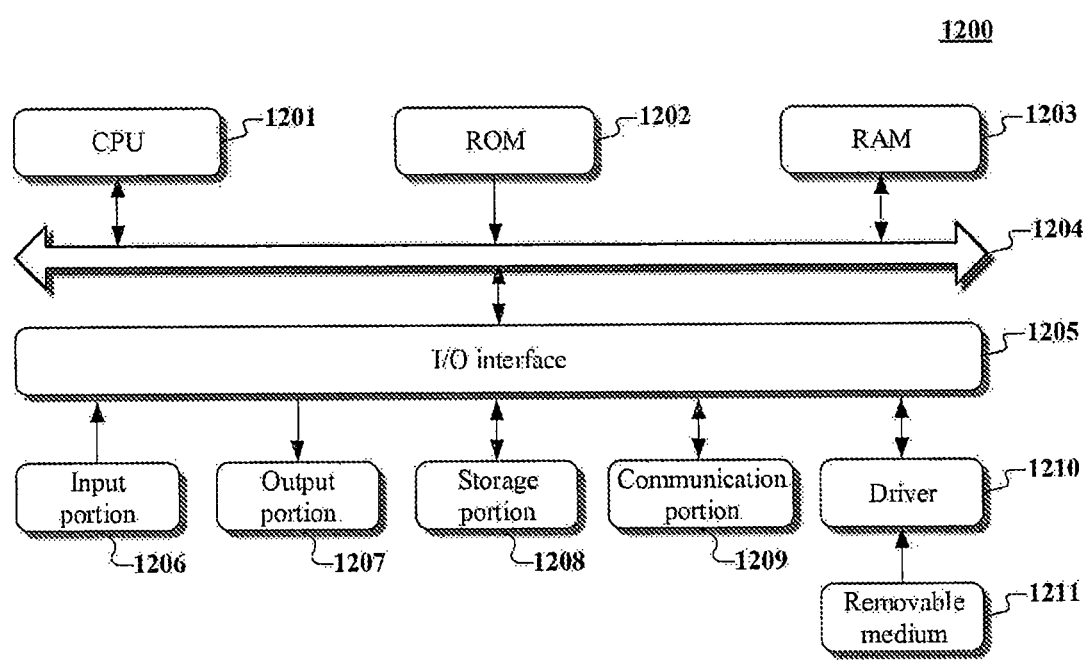
FIG. 12 is a schematic structural diagram of a computer system adapted to implement a server according to the embodiments of the present disclosure.

Referring to FIG. 12, FIG. 12 illustrates a schematic structural diagram of a computer system 1200 adapted to implement a server of the embodiments of the present disclosure. The server shown in FIG. 12 is merely an example and should not impose any restriction on the function and scope of use of the embodiments of the present disclosure.

As shown in FIG. 12, the computer system 1200 includes a central processing unit (CPU) 1201, which may execute various appropriate actions and processes in accordance with a program stored in a read-only memory (ROM) 1202 or a program loaded into a random access memory (RAM) 1203 from a storage portion 1208. The RAM 1203 further stores various programs and data required by operations of the system 1200. The CPU 1201, the ROM 1202 and the RAM 1203 are connected to each other via a bus 1204. An input/output (I/O) interface 1205 is also connected to the bus 1204.

The following components are connected to the I/O interface 1205: an input portion 1206 including a keyboard, a mouse. etc.; an output portion 1207 including a cathode ray tube (CRT), a liquid crystal display (LCD), a speaker, etc.; a storage portion 1208 including a hard disk and the like; and a communication portion 1209 including a network interface card, for example, a LAN card and a modem. The communication portion 1209 performs communication processes via a network such as the Internet. A driver 1210 is also connected to the I/O interface 1205 as required. A removable medium 1211, for example, a magnetic disk, an optical disk, a magneto-optical disk, and a semiconductor memory, may be installed on the driver 1210, to facilitate the installation of a computer program from the removable medium 1211 on the storage portion 1208 as needed.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 1209, and/or may be installed from the removable medium 1211. The computer program, when executed by the central processing unit (CPU) 1201, implements the above mentioned functionalities as defined by the method of the present disclosure. It should be noted that the computer readable medium in the present disclosure may be a computer readable signal medium, a computer readable storage medium, or any combination of the two. For example, the computer readable storage medium may include, but not limited to: an electronic, magnetic, optical, electromagnetic, infrared, or semiconductor system, apparatus, or device, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable medium may be any tangible medium containing or storing programs, which may be used by a command execution system, apparatus or device or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable medium. The computer readable medium is capable of transmitting, propagating or transferring programs for use by, or used in combination with, a command execution system, apparatus or device. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a computer of a user, executed partially on a computer of a user, executed as a standalone package, executed partially on the computer of the user and partially on a remote computer, or executed entirely on the remote computer or a server. When the remote computer is involved, the remote computer may be connected to a user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flow charts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, comprising an acquiring unit, an extracting unit, a determining unit, and a storing unit. The names of these units do not in some cases constitute a limitation to such units themselves. For example, the acquiring unit may also be described as "a unit for acquiring a target video and target video element information of the target video."

In another aspect, the present disclosure further provides a computer readable medium. The computer readable medium may be the computer readable medium included in the server described in the above embodiments, or a standalone computer readable medium not assembled into the server. The computer readable medium stores one or more programs. The one or more programs, when executed by the server, cause the server to: acquire a target video and target video element information of the target video; extract, based on the target video element information, a target video clip from the target video; obtain, based on a preset corresponding relationship between video element information and a keyword determining method for a video clip, a keyword representing a category of the target video clip; and match the keyword with a preset tag information set to obtain tag information of the target video clip, and associate and store the target video clip and the tag information.

In addition, the one or more programs, when executed by the server, may also cause the server to: acquire attention information representing content paid attention to by a target user, and match the attention information with preset tag information, the tag information being obtained according to the method described in any one of the embodiments of FIG. 2 to FIG. 8, and having a corresponding video clip; and generate, in response to determining the matching being successful, recommendation information for recommending the video clip.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for processing a video, comprising:
   acquiring a target video and target video element information of the target video;
   extracting, based on the target video element information, a target video clip from the target video;
   obtaining, based on a preset corresponding relationship between video element information and a keyword determining method for a video clip, a keyword representing a category of the target video clip; and
   matching the keyword with a preset tag information set to obtain tag information of the target video clip, and associating and storing the target video clip and the tag information;
   wherein the target video element information comprises a set of text information corresponding to an image frame included in the target video, and text introduction information for the target video, and the extracting, based on the target video element information, a target video clip from the target video comprises: determining, for the image frame included in the target video, a similarity between the text information corresponding to the image frame and the text introduction information; and determining a video clip comprising image frames associated with an image frame corresponding to a similarity greater than a preset similarity threshold as the target video clip; or
   the target video element information is a set of bullet screen information corresponding to an image frame included in the target video, and the extracting, based on the target video element information, a target video clip from the target video comprises: determining, for the image frame included in the target video, a number of pieces of the bullet screen information corresponding to the image frame; and determining a video clip comprising image frames corresponding to bullet screen information and arranged consecutively in the target video as the target video clip, numbers of pieces of the bullet screen information corresponding to the image frames being greater than a preset number threshold; or
   the target video element information is dubbing information of the target video, and the extracting, based on the target video element information, a target video clip from the target video comprises: performing audio recognition on the dubbing information, to obtain at least one piece of dubbing category information and a dubbing clip corresponding to the dubbing category information and included in the dubbing information, the dubbing category information representing a category of the corresponding dubbing clip; and selecting target dubbing category information from the at least one piece of dubbing category information, and determining a video clip corresponding to a dubbing clip corresponding to the target dubbing category information as the target video clip.

2. The method according to claim 1, wherein the target video element information is an image frame included in the target video; and the extracting, based on the target video element information, a target video clip from the target video comprises:

performing, for the image frame included in the target video, image recognition on the image frame to obtain an image recognition result for the image frame; and determining a video clip comprising image frames having associated image recognition results and arranged consecutively in the target video as the target video clip; or, the target video element information is a set of text information corresponding to an image frame included in the target video; and the extracting, based on the target video element information, a target video clip from the target video comprises:

extracting, for the image frame included in the target video, a target vocabulary included in the text information corresponding to the image frame; and determining a video clip comprising image frames corresponding to associated target vocabularies as the target video clip.

3. The method according to claim 2, wherein the obtaining, based on a preset corresponding relationship between video element information and a keyword determining method for a video clip, a keyword representing a category of the target video clip comprises:

determining, based on a preset corresponding relationship between the image recognition result and the keyword, the keyword corresponding to the image recognition result for the image frame included in the target video clip as the keyword of the target video clip.

4. The method according to claim 2, wherein the obtaining, based on a preset corresponding relationship between video element information and a keyword determining method for a video clip, a keyword representing a category of the target video clip comprises:

selecting, from target vocabularies corresponding to image frames included in the target video clip, a target vocabulary as the keyword of the target video clip.

5. The method according to claim 1, wherein the obtaining, based on a preset corresponding relationship between video element information and a keyword determining method for a video clip, a keyword representing a category of the target video clip comprises:

extracting, for image frames included in the target video clip, target vocabularies included in text information corresponding to the image frames; and selecting, from the target vocabularies corresponding to the image frames included in the target video clip, a target vocabulary as the keyword of the target video clip.

6. The method according to claim 1, wherein the obtaining, based on a preset corresponding relationship between video element information and a keyword determining method for a video clip, a keyword representing a category of the target video clip comprises:

recognizing, for image frames included in the target video clip, bullet screen information corresponding to the image frames, to obtain bullet screen category information representing a category of the bullet screen information corresponding to the image frames as the keyword of the target video clip.

7. The method according to claim 1, wherein the obtaining, based on a preset corresponding relationship between video element information and a keyword determining method for a video clip, a keyword representing a category of the target video clip comprises:

recognizing, based on a preset corresponding relationship between the dubbing category information and an audio recognition method, the dubbing clip corresponding to the target video clip, to obtain a keyword representing a category of the dubbing clip corresponding to the target video clip as the keyword of the target video clip.

8. A method for generating recommendation information, comprising:

acquiring attention information representing content paid attention to by a target user, and matching the attention information with preset tag information, the tag information being obtained according to the method in claim 1, and having a corresponding video clip; and generating, in response to determining the matching being successful, recommendation information for recommending the video clip.

9. A non-transitory computer readable medium, storing a computer program, wherein the program, when executed by a processor, causes the processor to implement the method according to claim 8.

10. An apparatus for generating recommendation information, comprising:

at least one hardware processor; and a memory storing instructions, wherein the instructions when executed by the at least one hardware processor, cause the at least one hardware processor to perform operations, the operations comprising:

acquiring attention information representing content paid attention to by a target user, and matching the attention information with preset tag information, the tag information being obtained according to the method in claim 1, and having a corresponding video clip; and generating, in response to determining the matching being successful, recommendation information for recommending the video clip.

11. A non-transitory computer readable medium, storing a computer program, wherein the program, when executed by a processor, causes the processor to implement the method according to claim 1.

12. An apparatus for processing a video, comprising:

at least one hardware processor; and a memory storing instructions, wherein the instructions when executed by the at least one hardware processor, cause the at least one hardware processor to perform operations, the operations comprising:

acquiring a target video and target video element information of the target video;

extracting, based on the target video element information, a target video clip from the target video;

obtaining, based on a preset corresponding relationship between video element information and a keyword determining method for a video clip, a keyword representing a category of the target video clip; and matching the keyword with a preset tag information set to obtain tag information of the target video clip, and associating and storing the target video clip and the tag information;

wherein the target video element information comprises a set of text information corresponding to an image frame included in the target video, and text introduction information for the target video, and the extracting, based on the target video element information, a target video clip from the target video comprises: determining, for the image frame included in the target video, a similarity between the text information corresponding to the image frame and the text introduction information; and determining a video clip comprising image frames associated with an image frame corresponding to a similarity greater than a preset similarity threshold as the target video clip; or the target video element information is a set of bullet screen information corresponding to an image frame included in the target video, and the extracting, based on the target video element information, a target video clip from the target video comprises: determining, for the image frame included in the target video, a number of pieces of the bullet screen information corresponding to the image frame; and determining a video clip comprising image frames corresponding to bullet screen information and arranged consecutively in the target video as the target video clip, numbers of pieces of the bullet screen information corresponding to the image frames being greater than a preset number threshold; or the target video element information is dubbing information of the target video, and the extracting, based on the target video element information, a target video clip from the target video comprises: performing audio recognition on the dubbing information, to obtain at least one piece of dubbing category information and a dubbing clip corresponding to the dubbing category information and included in the dubbing information, the dubbing category information representing a category of the corresponding dubbing clip; and selecting target dubbing category information from the at least one piece of dubbing category information, and determine a video clip corresponding to a dubbing clip corresponding to the target dubbing category information as the target video clip.

13. The apparatus according to claim 12, wherein the target video element information is an image frame included in the target video; and the extracting, based on the target video element information, a target video clip from the target video comprises:

performing, for the image frame included in the target video, image recognition on the image frame to obtain an image recognition result for the image frame; and determining a video clip comprising image frames having associated image recognition results and arranged consecutively in the target video as the target video clip; or, the target video element information is a set of text information corresponding to an image frame included in the target video, and the extracting, based on the target video element information, a target video clip from the target video comprises:

extracting, for the image frame included in the target video, a target vocabulary included in the text information corresponding to the image frame; and determining a video clip comprising image frames corresponding to associated target vocabularies as the target video clip.

14. The apparatus according to claim 13, wherein the obtaining, based on a preset corresponding relationship between video element information and a keyword determining method for a video clip, a keyword representing a category of the target video clip comprises: determining, based on a preset corresponding relationship between the image recognition result and the keyword, the keyword corresponding to the image recognition result for the image frame included in the target video clip as the keyword of the target video clip.

15. The apparatus according to claim 13, wherein the obtaining, based on a preset corresponding relationship between video element information and a keyword determining method for a video clip, a keyword representing a category of the target video clip comprises: selecting, from target vocabularies corresponding to image frames included in the target video clip, a target vocabulary as a keyword of the target video clip.

16. The apparatus according to claim 12, wherein the obtaining, based on a preset corresponding relationship between video element information and a keyword determining method for a video clip, a keyword representing a category of the target video clip comprises:

extracting, for image frames included in the target video clip, target vocabularies included in text information corresponding to the image frames; and selecting, from the target vocabularies corresponding to the image frames included in the target video clip, a target vocabulary as the keyword of the target video clip.

17. The apparatus according to claim 12, wherein the obtaining, based on a preset corresponding relationship between video element information and a keyword determining method for a video clip, a keyword representing a category of the target video clip comprises: recognizing, for image frames included in the target video clip, the bullet screen information corresponding to the image frames, to obtain bullet screen category information representing a category of the bullet screen information corresponding to the image frames as the keyword of the target video clip.

18. The apparatus according to claim 12, wherein the obtaining, based on a preset corresponding relationship between video element information and a keyword determining method for a video clip, a keyword representing a category of the target video clip comprises: recognizing, based on a preset corresponding relationship between the dubbing category information and an audio recognition method, the dubbing clip corresponding to the target video clip, to obtain a keyword representing a category of the dubbing clip corresponding to the target video clip as a keyword of the target video clip.

* * * * *